United States Patent
Soni et al.

(10) Patent No.: US 6,671,762 B1
(45) Date of Patent: *Dec. 30, 2003

(54) SYSTEM AND METHOD OF SAVING AND RESTORING REGISTERS IN A DATA PROCESSING SYSTEM

(75) Inventors: Naresh H. Soni, La Jolla, CA (US); David Isaman, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/999,298

(22) Filed: Dec. 29, 1997

(51) Int. Cl.[7] ............................................. G06F 13/32
(52) U.S. Cl. ...................................... 710/267; 709/108
(58) Field of Search ................................ 711/146, 162; 712/15, 228, 38, 229, 222; 709/100, 108; 710/267

(56) References Cited

U.S. PATENT DOCUMENTS

| | | | |
|---|---|---|---|
| 4,945,510 A | | 7/1990 | Maeda et al. ............... 364/900 |
| 5,050,067 A | * | 9/1991 | McLagan et al. ........... 709/108 |
| 5,142,677 A | * | 8/1992 | Ehlig et al. ................. 709/108 |
| 5,481,719 A | * | 1/1996 | Ackerman et al. .......... 709/108 |
| 5,535,397 A | * | 7/1996 | Durante et al. ............. 710/267 |
| 5,606,696 A | * | 2/1997 | Ackerman et al. .......... 709/108 |
| 5,649,230 A | * | 7/1997 | Lentz .......................... 710/22 |
| 5,727,211 A | * | 3/1998 | Gulsen ........................ 709/108 |
| 5,742,791 A | * | 4/1998 | Mahalingaiah et al. ..... 711/146 |
| 5,928,356 A | * | 7/1999 | Golliver et al. ............. 712/228 |
| 5,987,258 A | * | 11/1999 | Daniel et al. ............... 710/260 |
| 6,061,774 A | * | 5/2000 | Witek ........................ 711/202 |
| 6,256,776 B1 | * | 7/2001 | Melanson ..................... 717/4 |

* cited by examiner

Primary Examiner—St. John Courtenay, III
Assistant Examiner—Van Hoa Nguyen
(74) Attorney, Agent, or Firm—Lisa K. Jorgenson; William A. Munck

(57) ABSTRACT

A system and method is provided to reduce the latency associated with saving and restoring the state of the floating point registers in a microprocessor when switching tasks between floating point and MMX operations, or between tasks within the same context. The present invention maintains a secondary register file along with the primary floating point register file in the CPU. The primary register will keep the state of the floating point task "as is" upon the occurrence of a task switch to MMX, or another context. The address of the area where the FPU state is saved is maintained in a save area address register. The secondary register is then utilized by the other context to store intermediate results of executed instructions. In the majority of cases when a context switch back to floating point operations occurs, the previous state is restored from the primary register without incurring the latency of retrieving the instructions and data from the memory subsystem. In addition to the secondary register, a snooping mechanism will use the address of the state save area to determine if the state save area was modified. If the state save area is modified, then the floating point state must be restored from the memory subsystem in a conventional manner. However, the floating point save area will seldom be modified and the penalty for maintaining the floating point state in the CPU is negligible. Further, the present invention will allow the microprocessor to operate in a compatible manner with current operating systems and application software.

21 Claims, 11 Drawing Sheets

SYSTEM AND METHOD OF SAVING AND RESTORING REGISTERS IN A DATA PROCESSING SYSTEM

CROSS REFERENCE TO RELATED APPLICATIONS

U.S. patent application entitled "METHOD AND APPARATUS FOR PROVIDING FAST SWITCHING BETWEEN FLOATING POINT AND MULTIMEDIA INSTRUCTIONS USING TWO SETS OF REGISTER FILES", having Ser. No. 09/999,298 filed on Dec. 19, 1997.

The present invention is related to that disclosed in U.S. Patent Application Ser. No. 08/999,206, filed Dec. 29, 1997, now Pat. No. 6,145,049, issued on Nov. 7, 2000, which is assigned to the assignee of the present invention. The disclosure of this related patent application is incorporated herein by reference for all purposes as if fully set forth herein.

BACKGROUND OF THE INVENTION

1. Field of the Invention

The present invention generally relates to a method and apparatus for saving and restoring the state of various registers in a microprocessor. More particularly; a system is provided which allows the state of a floating point execution unit to be restored without requiring all of the data and instructions to be retrieved from main memory.

2. Description of Related Art

Based upon consumer demands for increased multimedia capabilities and functionality, the computer industry has responded with enhancements and new technology that will aid in the processing of multimedia computer software applications. One example is the multimedia extensions (MMX) to the Intel microprocessor architecture. These MIMX instructions provide capabilities that will allow software vendors to create applications with enhanced multimedia functions.

The architecture of Intel microprocessors is such that MMX instructions use the floating point unit (FPU) registers for instruction computation. The FPU circuitry within Intel x86 architecture microprocessors provide the user with an FPU data register file, having eight, 80 bit FPU data registers, which are accessed in a stack-like manner, i.e. the data is sequentially accessed from the top of the register file. The floating point registers are visible, and available for use by the programmer. The Intel architecture also provides a 16 bit control register and 16 bit status register. A data register tag word is also included that contains eight, 2 bit fields, each associated with one of the eight data registers. The tag word is used to improve context switching and stack performance by maintaining empty/non-empty status for each of the eight data registers.

It should be noted that context, or task, switching is controlled by the operating system (OS), such as OS/2, Windows 95, Windows NT, or the like. When a context switch is desired, the operating system generates a trap which will be received by a trap handler. The trap handler then saves the state of the previous context by causing FSAVE, FSTENV, or the like to be executed. It should also be noted that task switching can occur within a single context. For example, a switch can occur between different tasks in the floating point context. Similarly, task switching can also occur entirely within the MMX context.

Further, the Intel architecture contains an instruction pointer to the memory location containing the last floating point instruction word and data pointer to the memory location containing the operand associated with the last floating point instruction (if any).

As noted above, when Intel architecture microprocessors execute MMX instructions the FPU registers are utilized for instruction computation. Thus, 64 bits of the 80 bit FPU registers will be utilized by MMX instructions. When, for example, a task switch from a floating point operation to MMX operations occurs the OS trap handler will cause the register state to be saved using the floating point save (FSAVE) instruction. The FSAVE instruction stores the register state (whether floating point or MMX) to main memory. Execution of the FSAVE instruction by the microprocessor may take from 53 to 155 CPU clock cycles. The number of clock cycles is dependent upon the mode in which the microprocessor is operating, e.g. 16 bit, 32 bit, real mode, protected mode, or the like. Then, when a task switch back to floating point operations is desired, the operating system may use the floating point restore (FRSTOR) instruction to restore the floating point registers from main memory to the state they were in when the FSAVE instruction was executed. The FRSTOR execution may take from 75 to 95 CPU clock cycles, depending on the mode of the microprocessor. Thus, it can be seen that conventional techniques may take from, 128 to 250 clock cycles in order to save the state of the floating point registers to main memory and then restore the registers to their previous state, when switching between floating point and MMX operations.

Therefore, a need exists for a technique that can quickly and efficiently save and restore the state of the floating point register file when switching between floating point and MMX operations or between different tasks in the same context, using a minimum number of clock cycles.

SUMMARY OF THE INVENTION

In contrast to the prior art, the present invention provides a system and method that reduces the latency associated with execution of FSAVE and FRSTOR instructions when switching tasks between floating point and MMX operations, or between specific tasks within the floating point/MMX contexts.

Broadly, the present invention reduces the latency associated with saving and restoring the state of the floating point registers in a microprocessor when switching tasks between floating point and MMX operations, or between tasks within the same context. The present invention maintains a secondary register file along with the primary floating point register file in the CPU. The primary register file will keep the state of the floating point task "as is" upon the occurrence of a task switch to MMX, or another context. The address of the area where the FPU state is saved is maintained in a save area address register. The secondary register file is then utilized by the other context to store intermediate results of executed instructions. In the majority of cases when a context switch back to floating point operations occurs, the previous state is restored from the primary register file without incurring the latency of retrieving the instructions and data from the memory subsystem. In addition to the secondary register file, a snooping mechanism will use the address of the state save area to determine if the state save area was modified. If the state save area is modified, then the floating point state must be restored from the memory subsystem in a conventional manner. However, the floating point save area will seldom be modified and the penalty for maintaining the floating point state in the CPU is negligible. Further, the present invention will allow the microprocessor to operate in a compatible manner with current operating systems and application software.

It is expected that the present invention will reduce the latency associated with the execution of the FSAVE and FRSTOR instructions to approximately 3–4 cycles.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIGS. 15A–15F are flowcharts representing the process steps implemented by the present invention during context switching between tasks, such as floating point operations, MMX operations, or the like.

DETAILED DESCRIPTION OF THE PREFERRED EMBODIMENTS

As noted previously, for microprocessors compatible with the Intel architecture, MMX instructions use the floating point unit (FPU) registers for instruction computation.

Figure 1:
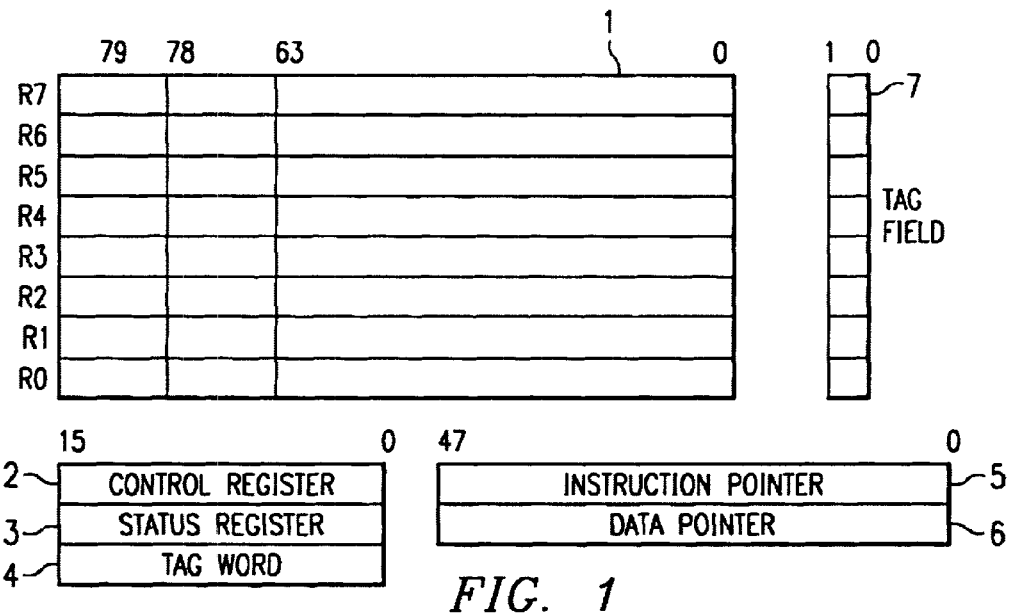
FIG. 1 is a block diagram showing the various registers of the floating point state utilized by the floating point execution unit in an Intel architecture microprocessor.

Referring to FIG. 1, the FPU circuitry within Intel x86 architecture microprocessors provide the user with an FPU data register file 1, having eight, 80 bit FPU data registers R0–R7, which are accessed in a stack-like manner. A sixteen bit control register 2 and sixteen bit status register 3 are also provided. Data register tag word 4 contains eight, 2 bit fields, each associated with one of the eight data registers R0–R7. The tag word is used to improve context switching and stack performance by maintaining empty/non-empty status for each of the eight data registers.

Also shown in FIG. 1, is an instruction pointer 5 to the memory location containing the last floating point instruction word and a data pointer 6 to the memory location containing the operand associated with the last floating point instruction (if any).

For the purposes of describing the present invention, task switching between Floating Point and MMX operations will be used herein to describe the present invention. However, it should be understood that the present invention also applies to task switching in a single context, such as switching from a first floating point task to a second floating point task, and switching between different MMX tasks, and the like.

As noted above, when Intel architecture microprocessors execute MMX instructions the FPU registers are utilized for instruction computation. Thus, the 64 bits of the 80 bit FPU registers R0–R7 will be utilized by MMX instructions. When a task switch from floating point operation to MMX, MMX to floating point, or the like, the register state is saved using, for example, the floating point save (FSAVE) instruction. The FSAVE instruction stores the register state to the memory subsystem.

In FIG. 1, tag field 7 illustrates the association of each of the eight 2-bit fields in the tag word with one of the physical data registers in FPU data register file 1. Specifically, tag word register 4 is comprised of two bits for each physical data register. Tag word fields (0–7 of field 7) assume one of four values depending on the contents of their associated register (R0–R7), i.e. Valid (00), Zero (01), Special (10), and Empty (11). Special values include Denormal, Infinity, QNaN, SNaN and unsupported formats. Tag values are maintained transparently by the Intel microprocessors and are only available to the programmer indirectly through the FSTENV and FSAVE instructions.

The FPU circuitry communicates information about its status and the results of operations to other functional units in the microprocessor via status register 3. The FPU status register is comprised of bit fields that reflect exception status, operation execution status, register status, operand class and comparison results. This register is continuously accessible to the microprocessor CPU, i.e. integer unit, regardless of the state of the control or execution units.

FPU mode control register 2 is used by the CPU to specify the operating mode of the FPU. Control register 2 contains bit fields which specify the rounding mode to be used, the precision (single or double) by which to calculate results and the exception condition which should be reported to the CPU via traps. The user controls precision, rounding and exception reporting by setting or clearing the appropriate bits in control register 2. For additional information see the ST486DX/DX2 Databook, published by SGS-THOMSON Microelectronics, Inc, and Pentium Processor Family Developer's Manual, Volume 3, both hereby incorporated by reference.

Figure 2:
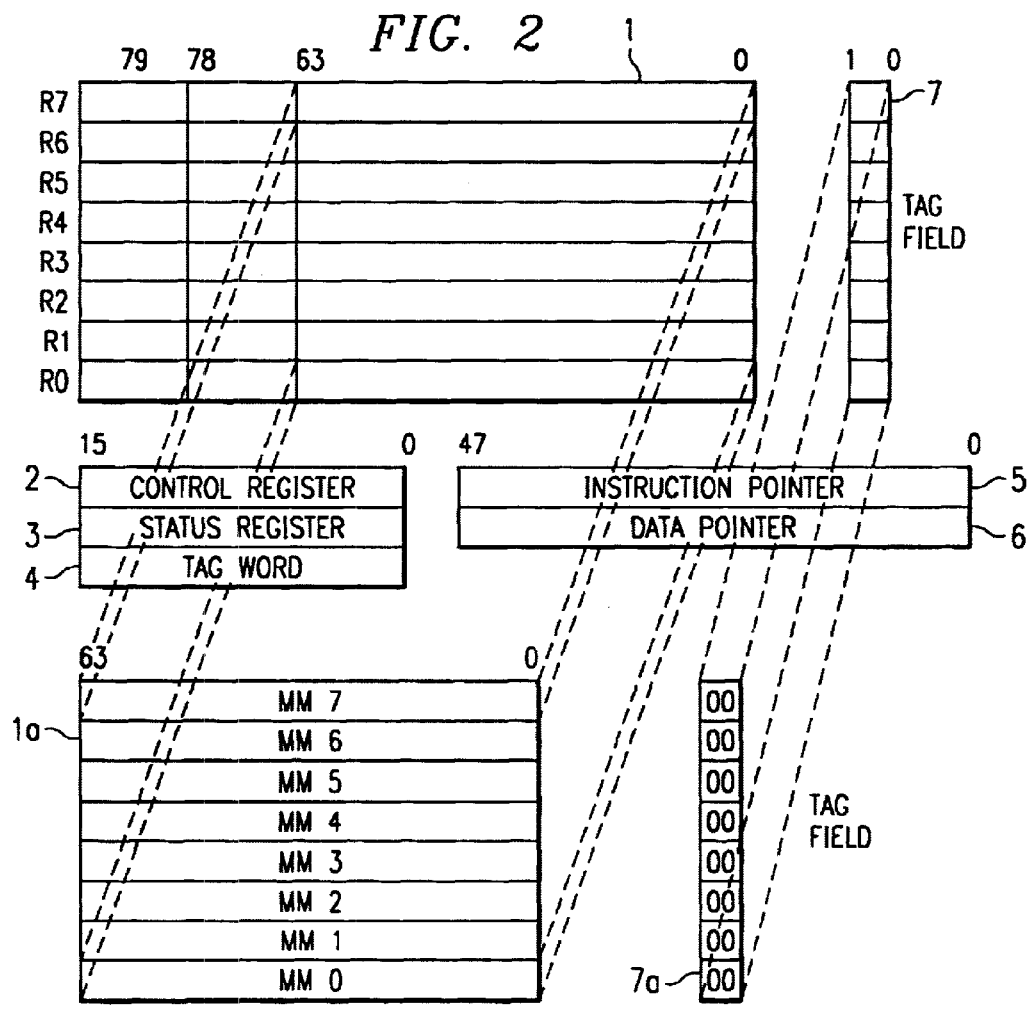
FIG. 2 is a block diagram of the registers shown in FIG. 1 which also shows use of the floating point registers by MMX instructions for multimedia operations.

Referring to FIG. 2, the FPU register file 1 is shown along with control register 2, status register 3, tag word 4, instruction pointer 5, data pointer 6 and tag field 7, as previously discussed. Also shown in FIG. 2 are FPU registers R0–R7 utilized as a 64 bit MMX register file 1a having fields MM0–MM7. The eight 2 bit tag field 7 is shown as tag field 7a when utilized in conjunction with MMX instructions. Typically, Intel architecture microprocessors execute MMX instructions using the FPU registers for instruction computation. Thus, FIG. 2 shows 64 bits of FPU registers R0–R7 being utilized by MMX instructions. When a task switch from floating point operation to MMX, MMX to floating point, or the like the register state is saved using the floating point save (FSAVE) instruction, or the like The FSAVE instruction stores the register state (whether floating point or MMX) to the memory subsystem. It should be noted that the FSAVE instruction saves the floating point environment (control register, status register, tag word, instruction and data pointers), as well as the contents of the floating point registers themselves. The FSTENV instruction stores the FPU environment. The FRSTOR instruction loads the FPU environment and registers, while the FLDENV instruction loads the FPU environment.

More particularly, for a task switch from floating point operations to another context, e.g. MMX or a different FP context, the current floating point state must be saved using the FSAVE/FSTENV instructions. As noted above, these instructions save the floating point state to memory and will take on the order of 53 to 155 CPU cycles. During an FSAVE/FSTENV instruction the following information is saved: FPU Control Word; FPU Status Word; FPU Tag Word; IP Offset; CS selector; Opcode; Data operand offset; and Operand selector. After saving this information, the FSAVE/FSTENV instruction sets the control word to 037F hex, status word to 0, tag word to FFFF hex, data pointer to 0, instruction pointer to 0 and last instruction opcode to 0. It should be noted that FSAVE instructions will also store the contents of FP data register 1. When this state information is saved, a floating point or MMX task will resume and use the floating point register file. Hence, a task switch from MMX to Floating Point, or vice versa, is very expensive in terms of system efficiency and latency. Thus, the present invention uses two register files, a primary file and a secondary file.

Figure 3:
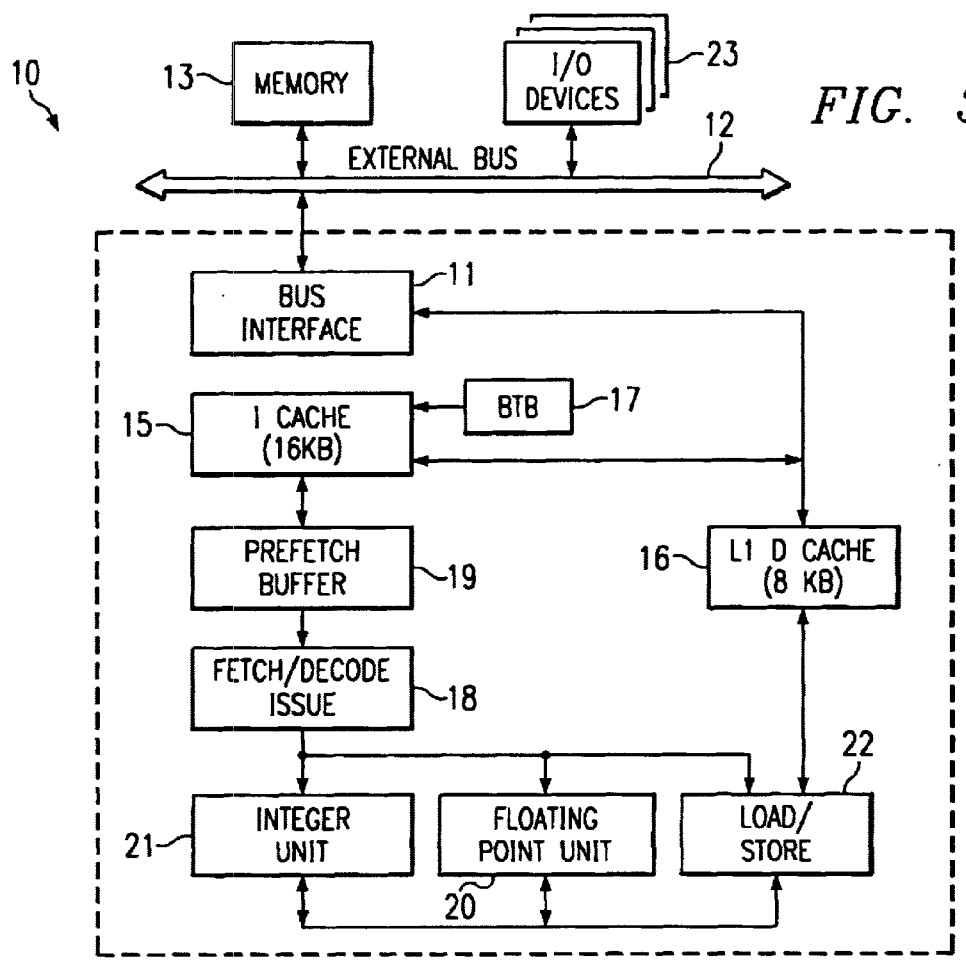
FIG. 3 is a block diagram of an exemplary microprocessor capable of implementing the preferred embodiments of the present invention.

Referring to FIG. 3, a block diagram of an exemplary microprocessor capable of executing the Intel instruction set and implementing the present invention is shown generally by reference numeral 10. Those skilled in the art will understand that many other differently configured microprocessors can also be utilized to implement the present invention.

Bus interface unit (BIU) 11 interfaces the microprocessor components with a system bus 12. Main memory 13 and various input/output devices 23 are also connected to bus 12. I/O devices may include a diskette drive, keyboard, mouse, parallel port, and the like. Control, address and data information is transmitted from microprocessor 10 onto bus 12 via BIU 11. Further, control, address and data signals from memory 13 and I/O devices 23 are received by BIU 11 for use by microprocessor 10. It should be noted that the control, address and data information will include microprocessor instructions, as well as operand data which will be manipulated by the instructions.

Memory management is provided by calculating a physical address from an effective address using a particular addressing mode. The CPU then uses the physical address to actually addresses specific locations in the physical memory device(s). A memory management unit (MMU) (not shown) typically includes a translation lookaside buffer (TLB) which is a cache for the paging mechanism. In a typical microprocessor, similar to the one shown in FIG. 3, the TLB is a page table cache that automatically keeps the most commonly used page table entries in the processor. An address calculation unit is also provided for memory management operations and is used to calculate the physical address by computing an offset address (effective address). Generally, the effective address is calculated by adding together up to three values: a base, an index and a displacement. The base, if present, is the value in one of the eight 32 bit general purpose registers (not shown) at the time of the execution of the instruction. These general purposes registers are included as part of the Intel architecture. The index is also a value contained in one of the 32 bit general purpose registers. The index differs from the base in that the index is first multiplied by a scale factor of 1, 2, 4 or 8 before the summation is made. The third component added the memory address calculation is the displacement which is a value of up to 32 bits which is supplied as part of the instruction.

Load/store functions are implemented by load/store unit 22 which executes load and store instructions on an arithmetic logic unit (ALU). Load and store instructions include load string (LODS), load task register (LTR), move data (MOV), and the like. Store instructions include store task register (STR), store string (STOS), and the like. Generally, load instructions retrieve data and/or instructions from cache/memory and place the information in one of the microprocessor registers, while store instructions place data and/or instructions into a cache/memory location from the microprocessor registers. Integer unit 21 may perform address calculations for the load and store instructions.

It should be noted that most microprocessors include a hierarchical memory subsystem. The memory subsystem usually includes a level one (L1) instruction cache 15 and data cache 16 which provide the instructions and data to the execution units (FPU 20, Integer Unit 21 and Load/Store unit 22). In many data processing systems, an off chip level two (L2) cache (not shown) is provided. While an L2 cache is smaller than main memory 13, retrieving information likely to be used by the processor from an L2 cache is much faster than loading the information from main memory. Main memory 13 is the last level of storage in the memory subsystem. Memory 13 is the largest storage area, but also requires the greatest number of cycles to be accessed by the microprocessor.

More particularly, level one (L1) instruction cache 15 is included in microprocessor 10, as shown in FIG. 3. Cache 15 stores microprocessor instructions that are to be provided to the microprocessor execution units.

L1 data cache 16 is also provided, as shown in FIG. 3, and can be configured to run in write-through mode, or in a higher performance write-back mode. The write-back mode optimizes performance of the CPU core by eliminating bus bottlenecks caused by unnecessary external write cycles. Write-through cache architectures require that all writes to the cache also update external memory simultaneously. These unnecessary write cycles create bottle necks which can result in CPU stall and adversely impact performance. In contrast, a write-back architecture allows data to be written to the cache without updating external memory. With a write-back cache external write cycles are only required when a cache miss occurs, a modified line is replaced in the cache, or when an external bus master requires access to data. Four-way set associative architecture and a least recently used (LRU) algorithm are used in cache 16. Of course, cache 16 can be operated in write-through mode when desired. Depending on the cache architecture, the line size of cache 16 may be 16 bytes, 32 bytes, or the like, and new lines are only allocated during memory read cycles. Valid status is then maintained on a 16 byte cache line basis, but modified or "dirty" status for write-back mode is maintained on a 4-byte (double word) status. Therefore, only the double words that have been modified are written back to external memory when a line is replaced in the cache. The CPU can access the cache in a single internal clock cycle for both reads and writes. As noted above, instructions and data are stored separately in the L1 cache in order to increase performance.

Instruction cache 15 is connected to an instruction prefetch buffer 19 which is provided to store microprocessor instructions prior to their being fetched by instruction fetch/decode unit 18. Instructions are loaded into the buffer by being "prefetched" from the instruction stream. As instructions are fetched by unit 18, new instructions are loaded into the buffer. This ensures that the executions units will always have a continuous supply of instructions and prevents any "bubbles" from occurring in the pipeline. A branch target buffer 17 is used to predict the target address of a "branch" or "jump" instruction. That is, the target address is precalculated (predicted) and stored in buffer 17. Thus, when an unconditional branch is taken, or a conditional branch instruction is encountered, the address for the next (non-sequential) instruction is already known and available for use by the corresponding execution unit (floating point or integer).

Figure 4:
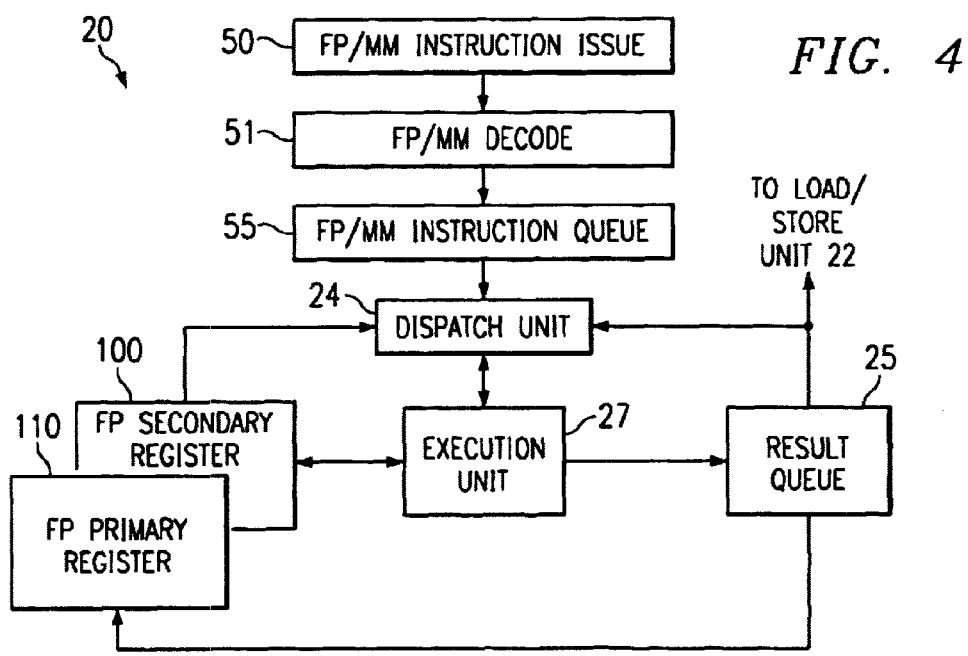
FIG. 4 is a block diagram of the floating point unit of the microprocessor of FIG. 3.

In addition to being fetched by unit 18, the instructions are also decoded and issued, or dispatched. For example, load/store instructions are issued to load/store unit 22 for execution and memory address calculation, and to a memory control unit, or the like, for scheduling. In some cases integer unit 21 may be used to perform memory address calculations. Integer instructions, such as add (ADD), multiply (IMUL), move (MOV) and the like are also issued by fetch/decode/issue unit 18 to integer unit 21. Floating point unit 20 receives the issued floating point instructions from unit 18 for execution thereon. The floating point unit 20 includes an execution unit 27 (FIG. 4). FPU 20 includes eight 80 bit registers with a 64 bit interface and is capable of parallel execution. The exemplary Intel architecture floating point unit 20 uses the x87 instruction set and is compatible with IEEE standard 754. Load/store unit 22 includes a snooping mechanism that ensures coherency of data throughout the memory subsystem. The present invention utilizes this snooping mechanism, as described in more detail below.

Referring to FIG. 4, a block diagram of floating point unit 20 of microprocessor 10 is shown. As can be seen from FIG. 4, floating point and MMX instructions will both be executed by FPU 20. Floating point/MMX instructions are issued from fetch/decode/issue unit 18, where they have been pre-decoded to determine that they are either floating point or MMX instructions. Additional circuitry is provided in this stage to designate the use of floating point register set 0, 110 and/or register set 1, 100. The Floating Point/MMX instructions are then associated with their corresponding operand data in FP register set 100, 110, as the case may be.

FP/MMX decode unit 51 receives the predecoded instructions from fetch/decode/issue unit 18, as discussed above. Floating point/MMX instructions are then fully decoded in Floating Point/MMX decode unit 51. The instruction is then stored in floating point/MMX instruction queue 55 prior to being dispatched for processing on execution unit 27. Dispatch unit 24 will determine when instructions from FP instruction queue 55 are to be provided to execution unit 27. The instructions are then provided to execution unit 27 for execution. The instructions (floating point or MMX) are then executed by floating point execution unit 27. Execution unit 27 performs typical floating point operations, such as Add Multiply, Shift, absolute value, negative number operations, and the like. The output of FP execution unit 27 is provided to a result queue 25 where the execution result will be buffered. The result data from result queue 25 will be written back to the register files 100, 110, in a manner as designated by the fetch/decode/issues stage 18. Additionally, intermediate result data can be provided directly from execution unit 27, result queue 25 or register sets 100, 110 to dispatch unit 24, when further processing is needed. The microprocessor will typically be initialized with the floating point or MMX instructions updating the FP register file 110. Floating point or MMX store instructions will write the completed result from the register files 100, 110 back to main memory 13 through load/store unit 22.

Next, the context switching technique of the present invention will be described whereby the primary floating point and secondary registers will be designated depending on the task (floating point/MMX) being performed.

Figure 5:
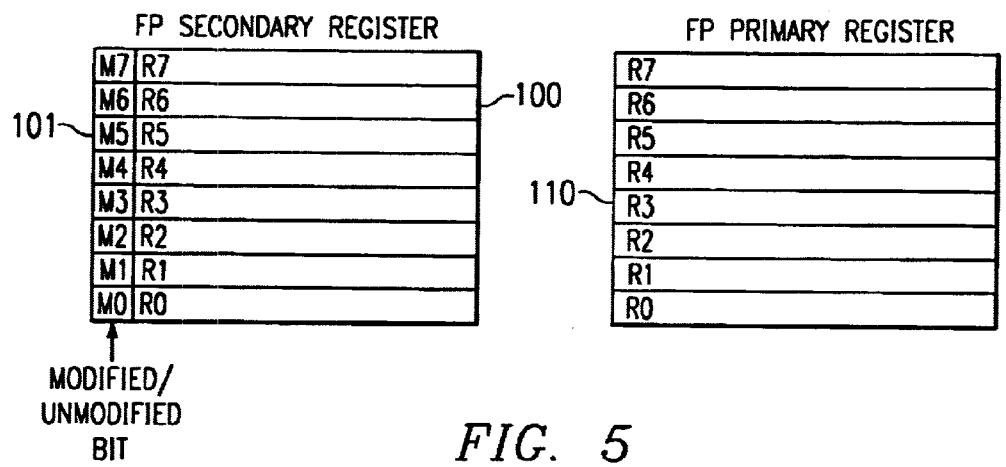
FIG. 5 is a block diagram of the primary floating point register file and secondary register file during initialization.

FIG. 5 shows secondary register 100 having a one bit modified/unmodified bit field 101 associated therewith. Each register in secondary register file 100 is attached with a modified/unmodified bit (M0–M7) that indicates if the corresponding register (R0–R7) is modified. The modified/unmodified bit is initialized to 0. If one of the secondary registers is modified, then its corresponding modified/unmodified bit is set to 1. Floating point primary register file 110, is also shown in FIG. 5. Each of secondary register file 100 and floating point primary register file 110 includes eight registers as described above in conjunction with FIGS. 1 and 2.

Thus, at initialization and during initial floating point operations, the secondary register file 100 and floating point primary register file 110 will contain the same information in their registers, such that the secondary register file is a mirror image of the floating point primary register file.

The contents of the primary register file are maintained on a FSAVE/FSTENV instruction and the secondary register file will be used for the task after the FSAVE/FSTENV instruction. When a restore instruction, such as FRSTOR/FLDENV is executed, the active register file would be the primary register. To maintain coherency between the primary and secondary file, a set of modified/unmodifed bits are used. These modified/unmodified bits are used (convey) if a corresponding register contents have been modified (are different). If a read operation is performed on a register, the corresponding modified/unmodified bit is read. If the modified/unmodified bit is clear (set=0), then the contents of the primary register file are read, else the contents of the secondary register file are read.

The present invention uses several rules to set (1) or clear (0) the modified/unmodified bits.

1. Clear the modified/unmodified bits on reset.
2. Clean the modified/unmodified bits upon execution of an FSAVE/FSTENV instruction.
3. Set the modified/unmodified bit of a corresponding register when performing a register write.
4. Do not change the modified/unmodified bits if the last operation is FRSTOR.

The present invention uses the following rules to determine whether the primary or secondary register file is to be written depending on the last context change, i.e. FSAVE or FRSTOR.

1. If the last operation is FSAVE/FSTENV, write to the secondary register file.

2. If the last operation was FRSTOR/FLDENV write to the primary register file.

At initialization, the primary register file will be used. All of the modified/unmodified are cleared (set=0).

Figure 6:
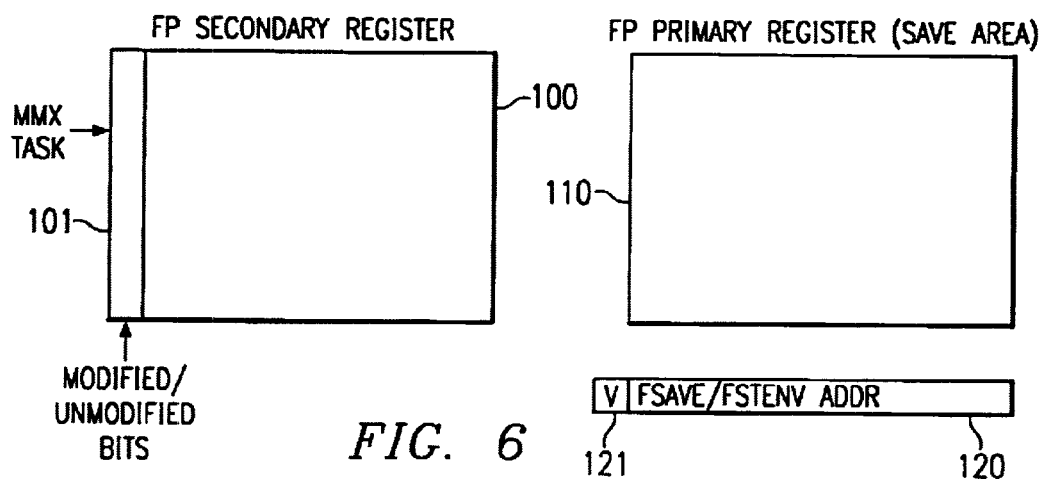
FIG. 6 shows the primary and secondary floating point registers and save area address register during a switch to MMX task.

Next, referring to FIG. 6, the present invention will be described wherein it is assumed that the microprocessor is initialized in floating point mode and begins performing floating point operations. As noted above the present invention also applies to task switching within the same context, such as between different floating point tasks, or MMX tasks. After completion of the FP operations, the task is then switched to MMX multimedia operations, or the like. Since MMX operations are intrusive, the programmer and/or operating system saves the floating point state to a save area using the FSAVE/FSTENV instruction. When FSAVE/FSTENV retires, the processor switches to the secondary register file for execution of MMX instructions, or the like. That is, subsequent to the FSAVE/FSTENV instruction, the processor updates only the secondary register file and does not update the primary register file. The processor updates only the secondary register file so that the state of the floating point operations will remain unchanged in floating point primary register 110. In this manner, the microprocessor is capable of maintaining, or saving the state of the floating point/MMX operations in register file 110 for further use, while utilizing secondary register file 100 for MMX/floating point instructions. As described in more detail below, when the task returns to floating point operations, the floating point state from primary register file 110 will be used to resume operations, without the need of retrieving the state information from the memory subsystem (as used herein "memory subsystem" refers to main memory and memory controllers, intermediate cache storage and cache controllers).

Also, the address corresponding to the FSAVE/FSTENV instruction is saved in a snoop address register 120, which includes a valid bit field "V", 121. When the address is saved in accordance with the FSAVE/FSTENV instruction, the valid bit is turned on (set=1). In addition, the load/store unit 22 is sent a signal to cause the address corresponding to the FSAVE/FSTENV address to be monitored for snoop hits. On a snoop hit, the valid bit of the saved address, "V" is cleared (set=0), which indicates that the saved register file contents (in this case primary register 110) are invalid and the state information must be retrieved from memory . Also, all the store operations are monitored for the address match corresponding to the FSAVE/FSTENV address. If a store is performed to the save address, then the valid bit is also set=0, again indicating that the state information has been modified and must be restored from memory.

The following rules are used by the present invention to control the valid bit for the stored save area address that corresponds to the FSAVE/FSTENV instruction.

1. Set the valid bit after the FSAVE/FSTENV instruction is executed.

2. Clear the valid bit after the FRSTORJFLDENV instruction is executed, if, the contents of the primary register are not modified.

The previously described mechanisms will provide program integrity for the software running on the microprocessor of the present invention. The present invention optimizes the save and restore functions by normally eliminating the need to restore state information from the memory subsystem, since it is known that program applications will rarely modify a save area directly. If the program does modify a save area, the application will be penalized and has to obtain the information from the corresponding save area in the memory subsystem. Thus, the floating point state can be retrieved from the primary floating point register file 110 the vast majority of the time, thereby drastically increasing overall microprocessor performance.

At this point, the floating point state information is saved to the memory subsystem (save area) and maintained in the frozen primary register file 110. Thus, the incoming MMX task/subroutine can use the secondary register file 100 for multimedia instructions, or FP instructions from a different context. When the MMX task writes to the secondary register, the corresponding modified/unmodifed bit will be set. The store instructions corresponding to the FSAVE/FSTENV area follows the same path as a normal store instruction.

The MMX task will generally load the MMX registers before it performs an MMX operation. When an MMX task performs a register load operation, the modified/unmodified bit in field 101 is set=1, indicating that the associated register in secondary register file 100 is modified and will be different from the same register in the primary floating point register file. That is, if register R0 of the secondary register file 100 is modified, then its associated bit M0, in field 101 will be set to 1. However, register R0 of the primary register file 110 will remain in its unmodified state, i.e. the state it was in when FSAVE/FSTENV was executed.

Next, in accordance with FIG. 7, the situation will be described wherein the MMX task ends and the floating point task resumes. The floating point state will be restored by executing the FRSTOR/FLDENV instruction. Before the FRSTOR/FLDENV is retired (completed) if an intervening snoop hit or store operation to any address within the save area (FSAVE/FSTENV) has occurred, then all of the instructions subsequent to (younger) the FRSTOR/FLDENV instruction will be flushed and reissued. In this case, the previous state will be restored from the memory subsystem, since the information in the save area has become invalid (a store or a snoop hit has occurred, indicating the data/instructions has been modified). The address corresponding to the FRSTOR/FLDENV is matched with the save area address FSAVE/FSTENV (to ensure that the application/task is restoring the previously saved state), and if there is a match and the save area address is valid (V bit is set), then the FP state can be restored from the primary floating point register file 110, which has been maintained during MMX operations. If, however, the addresses do not match, then a load operation from the memory subsystem at the address corresponding to the FRSTOR/FLDENV is performed to restore the FP state.

In the case where a snoop hit or store operation has occurred to the save area in memory, the floating point/MMX state is restored from the memory subsystem. Provision of the snooping mechanism by the present invention will not incur any additional expense or overhead, since the vast majority of microprocessors available today already include snooping capability. The snooping mechanism basically includes a range comparator, or the like that determines if a first address in the snoop register 120 matches the address of the FSAVE/FSTENV instruction. In addition to the valid bit, an associated record is also stored which indicates whether the operand length is 16 or 32 bits.

Figure 7:
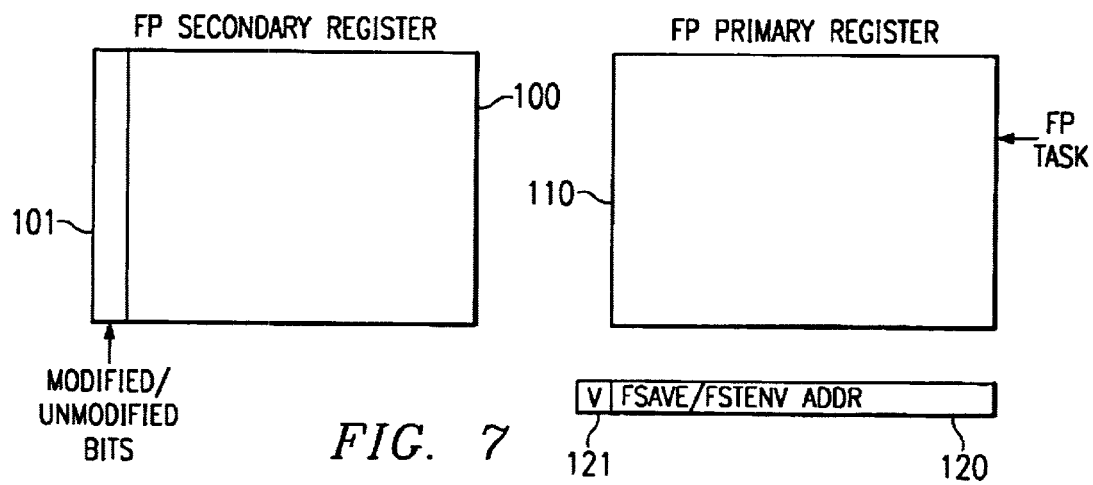
FIG. 7 shows the primary and secondary floating point registers of the present invention during a switch from MMX to floating point task.

As can be seen in FIG. 7, a load operation from the memory subsystem, will restore from the memory save area to the primary FP register file. After restoring the primary register file, the FP task will update only the primary floating point register file 110. Also, upon restoration of the primary register file, the modified/unmodified bits in field 101 and the valid bit in bit field 121 are cleared. All read operations are performed from the primary register and all write operation are performed to the primary register file. All the floating point operations that occur after the FRSTOR/FLDENV (younger) will depend on the FRSTOR/FLDENV instructions and will use the primary register file.

Figure 8:
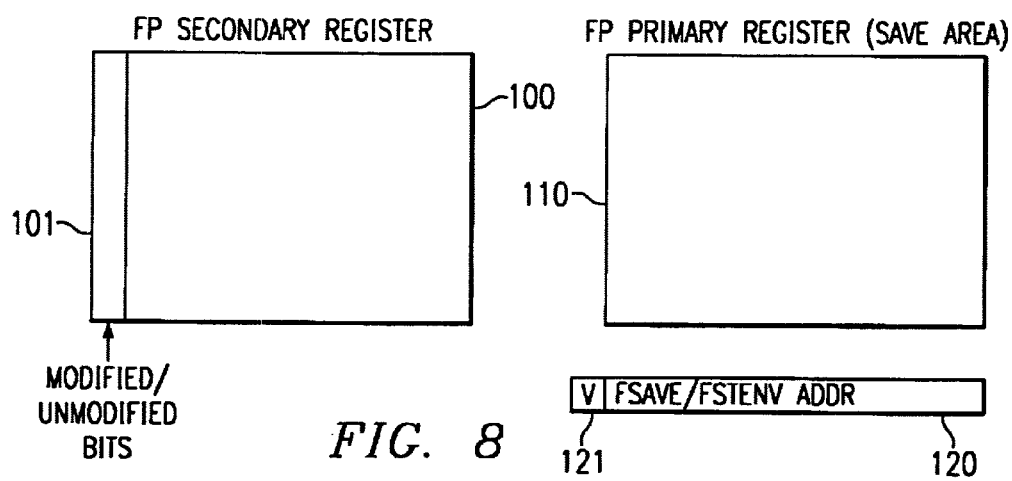
FIG. 8 is a diagram of the primary and secondary floating point registers during a switch back to MMX task

When the operating system switches tasks from floating point instructions back to MMX operations (FIG. 8), the OS will cause an FSAVE/FSTENV instruction to be executed that will save the FP state, as previously discussed. The address of the save area will be stored in register 120, as shown in FIG. 8, for snoop/store monitoring.

Again, an MMX task will usually load the MMX registers before performing an MMX operation. However, if the MMX task performs a save or a read-modify-write operation (POR, PAND), or the like, before updating any of the MMX registers, the modified/unmodified bit (field 101) of secondary register 100 will be compared, or tested, to determine if the register has been modified (bit=1). If not, then the contents of the corresponding register from the primary register file 110 are used for computation. More particularly, if an MMX save operation for register R0 of secondary register file 100 occurs, then the present invention will test modified/unmodified bit M0. If M0 is set=0 (unmodified), then the data/instruction from the corresponding primary register R0 are used. When the task switches from floating point operations to MMX, the updates to the primary floating point register file are ceased to maintain the integrity of the floating point register (save area). More particularly, when the modified/unmodified bit corresponding to a particular register in the secondary register file is unmodified, then the contents of the corresponding register in the primary register file are used for the MMX save operation. However, if the modified/unmodified bit is set=1, indicating that the data has been modified, then the contents of the secondary register are used for the MMX save operation. This is due to the fact that the data in the primary register file corresponding to the modified secondary register is wrong. That is, the modified data in the secondary register is the most current data, while the corresponding data in the primary register is old, or stale. In this manner, information is selectively used from either the primary register file, or secondary register file, depending on the modified/unmodified status of the information in the secondary register file.

In some cases it is possible for there to be sequential, or back to back, save instructions (FSAVE/FSTENV) without any intervening restore instructions (FRSTOR/FLDENV). Since the present invention is a complete solution that will work in all occurrences, this possibility must he addressed.

Figure 9:
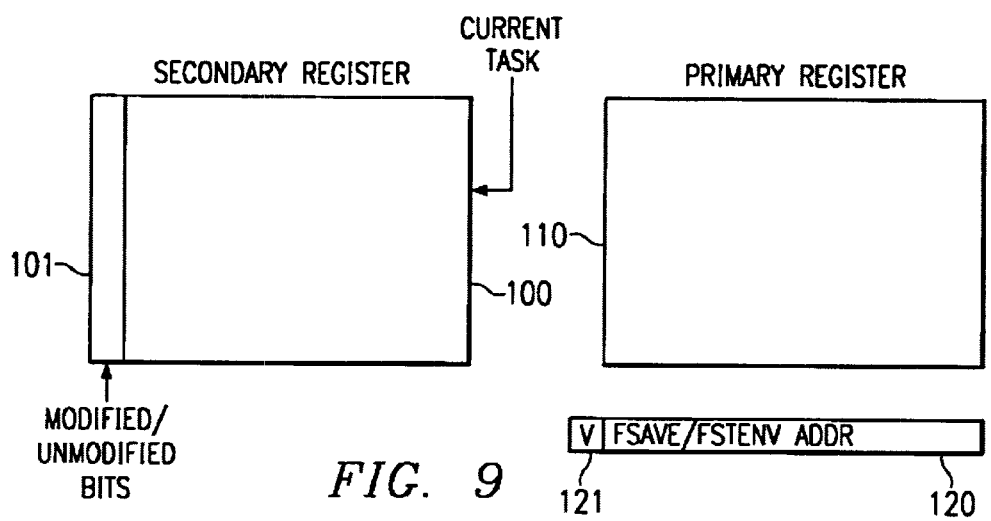
FIG. 9 shows the initial condition of the primary and secondary FP registers with the current task utilizing the secondary register file.

As shown in FIG. 9, the current task is using the secondary register file 100. When the processor executes an FSAVE/FSTENV instruction, per the previously discussed rules, it will determine if there was an intermediate FRSTOR/FLDENV since the last FSAVE/FSTENV instruction. If not, then the processor checks the modified/unmodified bits of each secondary register. If it is set (1), then the processor saves the contents of the modified secondary register to the corresponding primary register. This transfer can be implemented using microcode, which checks the status of the modified/unmodified bits in field 101. Also, since this transfer between two register files is not a typical floating point type transfer (implemented in microcode), an operation in the floating point ALU is defined to perform a one to one transfer from one register file (e.g. secondary file 100) to another register file (e.g. primary file 110).

Figure 10:
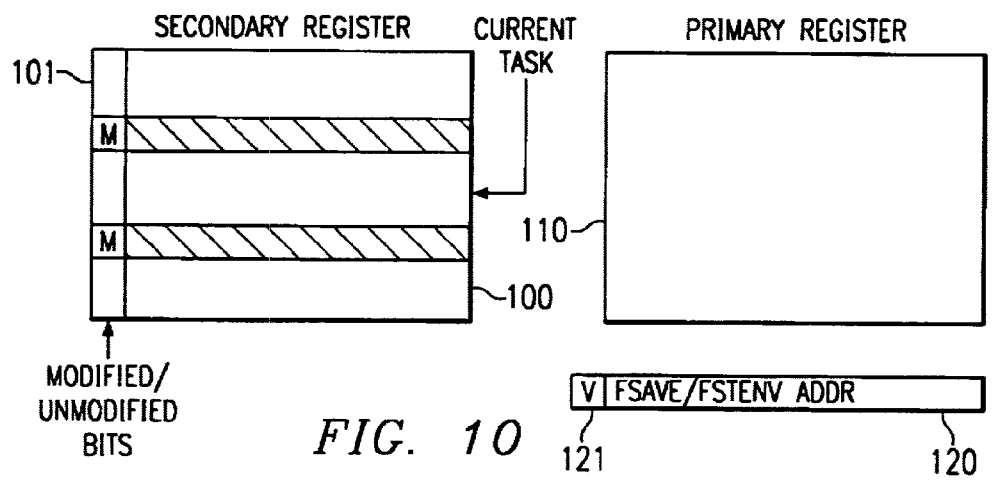
FIG. 10 is a diagram showing the modified/unmodified bits that have been set during execution of the current task.
Figure 11:
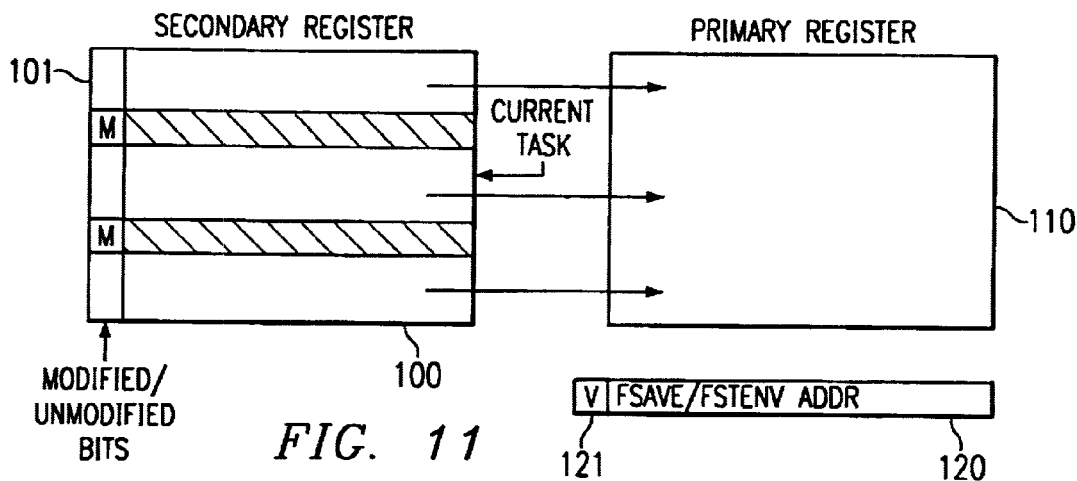
FIG. 11 shows transfer of the unmodified information from the secondary register file to the primary register file after an FSAVE/FSTENV instruction.

FIG. 10 depicts the situation where a task (FP or MMX) is executing using the secondary register file. It can be seen that two shaded registers are shown which have corresponding modified/unmodified bits that have been set (1). As illustrated by FIG. 11, when the processor executes an FSAVE/FSTENV instruction the modified secondary registers are transferred to the corresponding primary registers. For example, taking FIG. 5 in conjunction with FIGS. 9, 10 and 11, if secondary registers R2 and R5 are designated as being modified (modified/unmodified bits M2 and M5 are set=1), then upon execution of a save operation (FSAVE/FSTENV) these modified registers, R2 and R5 are transferred from the secondary register file 100 to the primary register file 110 (FIG. 11). After copying the contents of these modified registers from the secondary register file, all modified/unmodified bits are cleared, the valid bit 121 for the address encoded in the FSAVE/FSTENV instructions is set, and the address corresponding to the FSAVE/FSTENV instruction is saved. At this point the present invention has reset the registers such that the task can begin using the primary registers 110. In this manner, the modified registers, containing the most current data are saved to the primary registers such that the FSAVE/FSTENV instruction (which saves the state of the primary register file) will have the most current data. That is, the modified data from the secondary register file (which is the most up to date, since the current task was executing on the secondary register file) will be stored in the primary register file. Upon execution of the FSAVE/FSTENV instruction, the primary register file is then stored in the memory save area.

Figure 12:
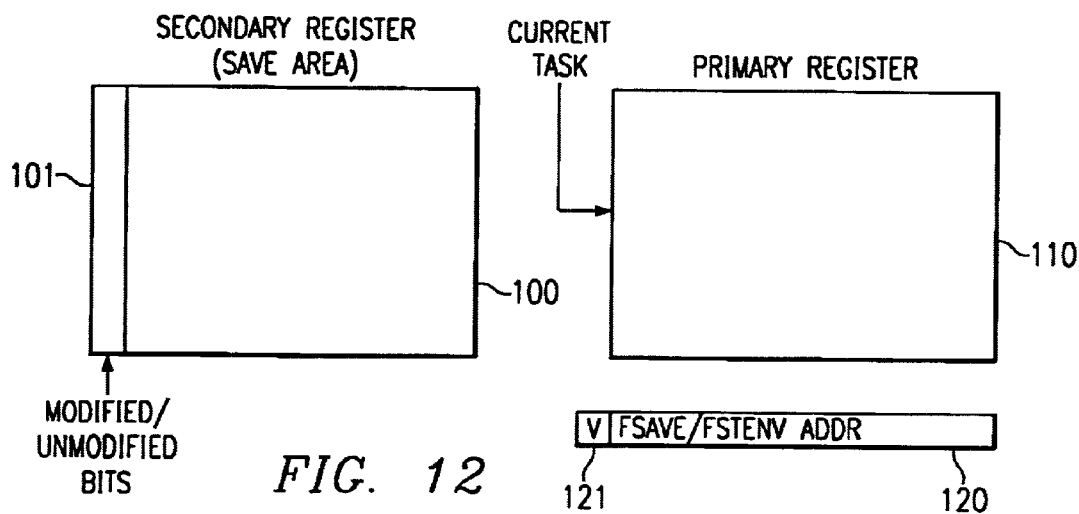
FIG. 12 shows a task switch with the currently executing task using the primary registers, after the modified/ unmodified bits have been cleared and a second FSAVE/ FSTENV is encountered (without intervening FRSTOR/ FLDENV)

The new task (FP or MMX) will then start using the primary register file, as shown in FIG. 12. When the processor executes another FSAVE/FSTENV instruction, the modified registers from the secondary register file are copied into the primary register file and the program continues to write to the secondary register file. This will ensure that the primary register file will have the current contents upon a task switch (to the primary register file). All of the modified/unmodified bits are then cleared. The address corresponding to the FSAVE/FSTENV instructions is saved and the valid bit is turned on (1).

Figure 13:
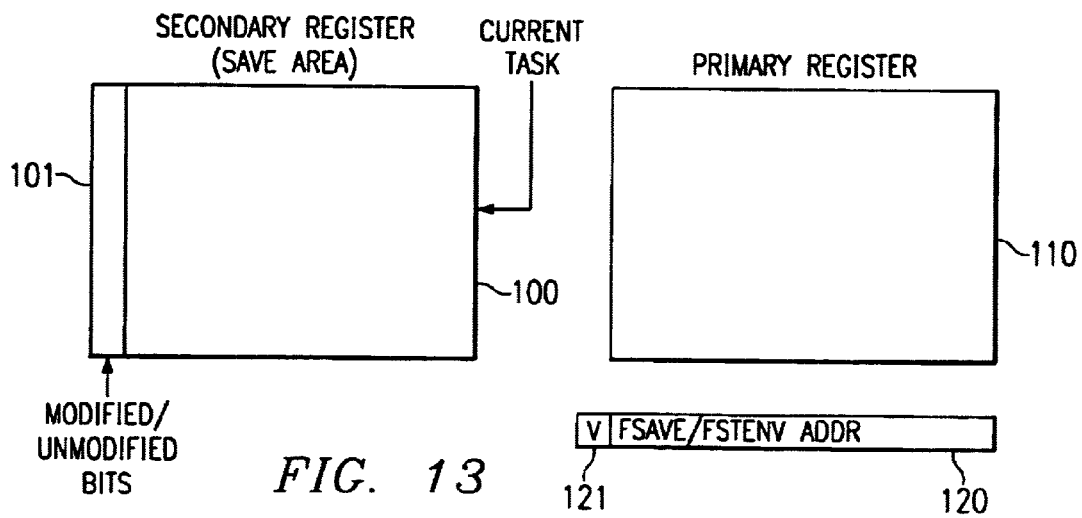
FIG. 13 shows a task switch back to the secondary register file after execution of a FRSTOR/FLDENV instruction and the address matches the address of the last FSAVE/ FSTENV.
Figure 14:
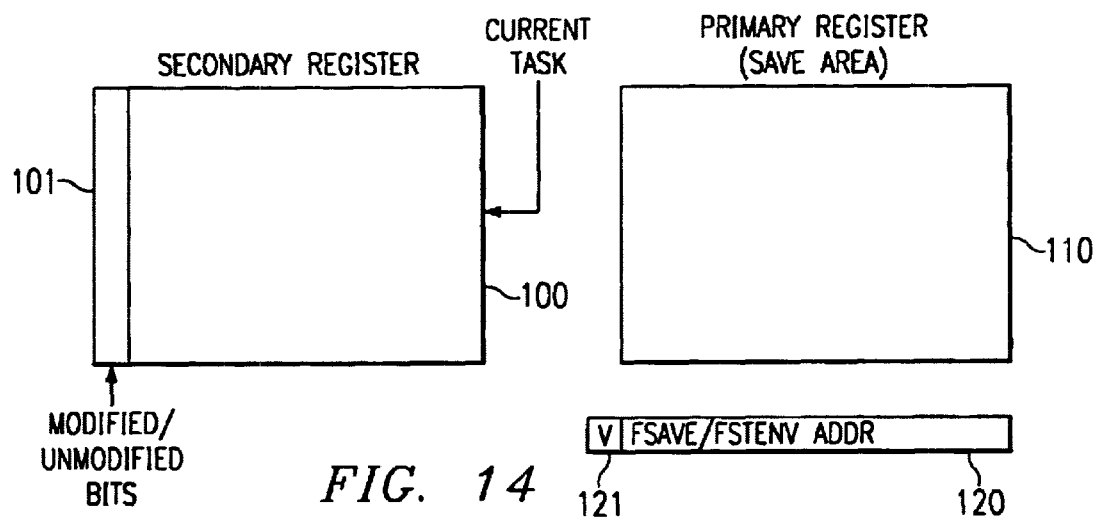
FIG. 14 shows a task continuing to use the secondary register file after execution of a second FRSTOR/FLDENV instruction (without intervening FSAVE/FSTENV), and there is an address match with the immediately preceding FSAVE/FSTENV.
Figure 15A:
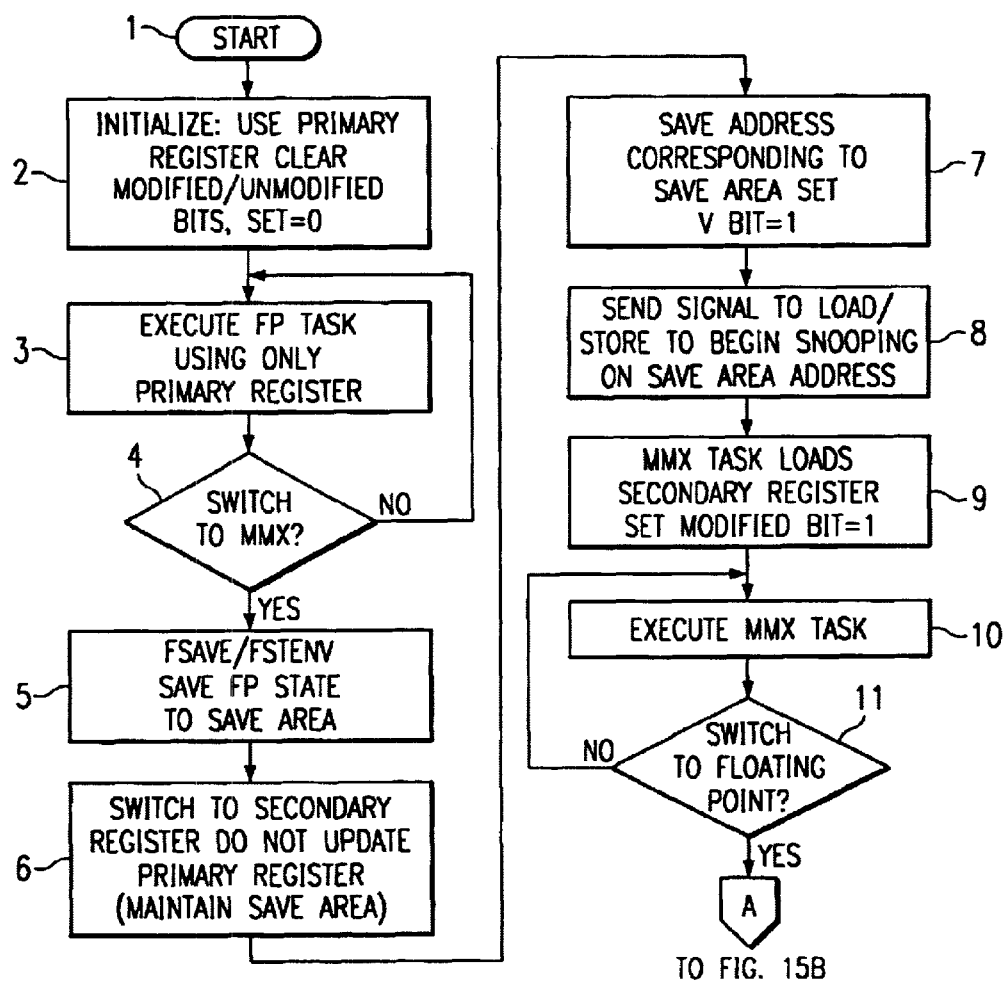
Figure 15B:
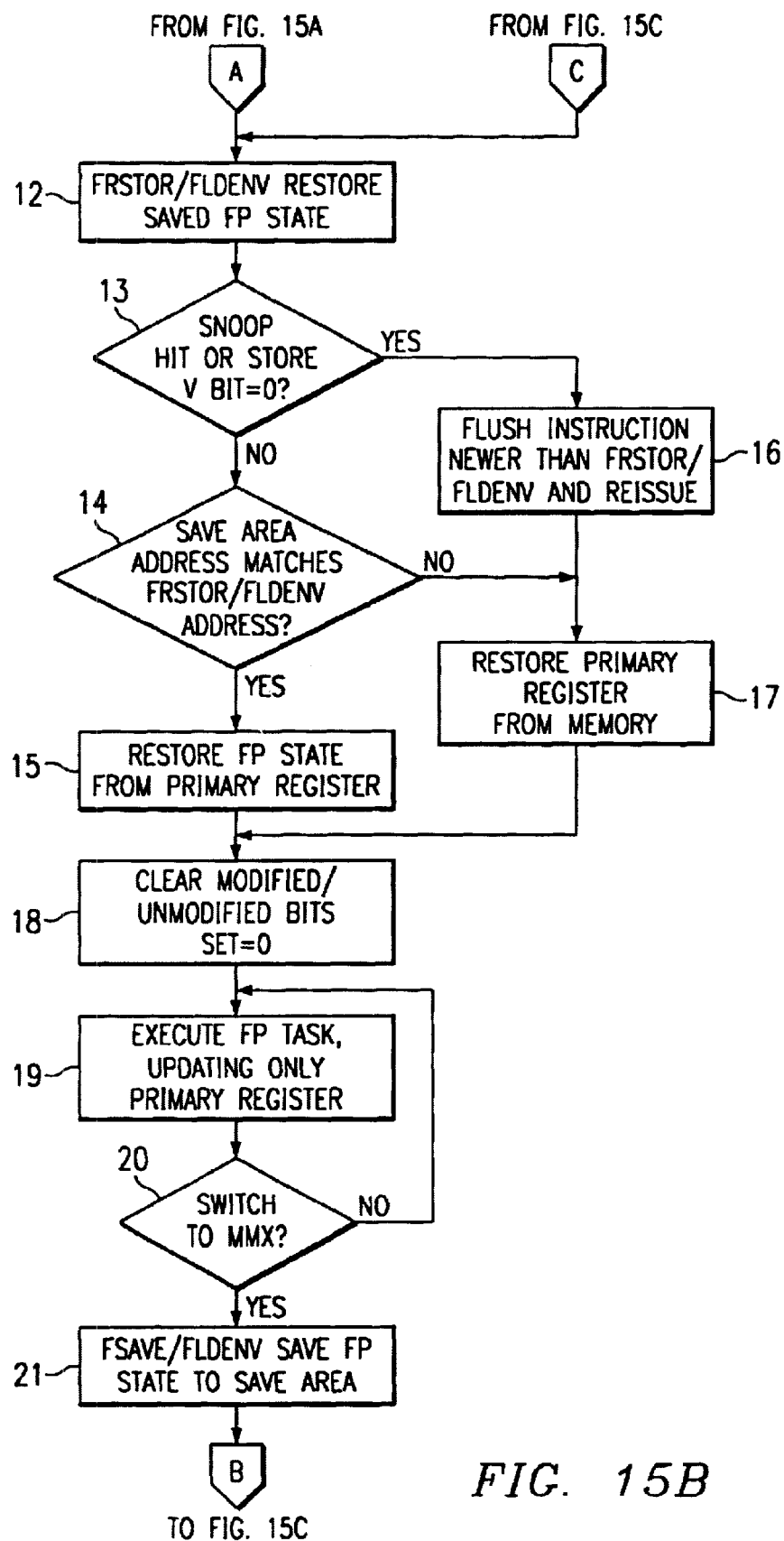
Figure 15C:
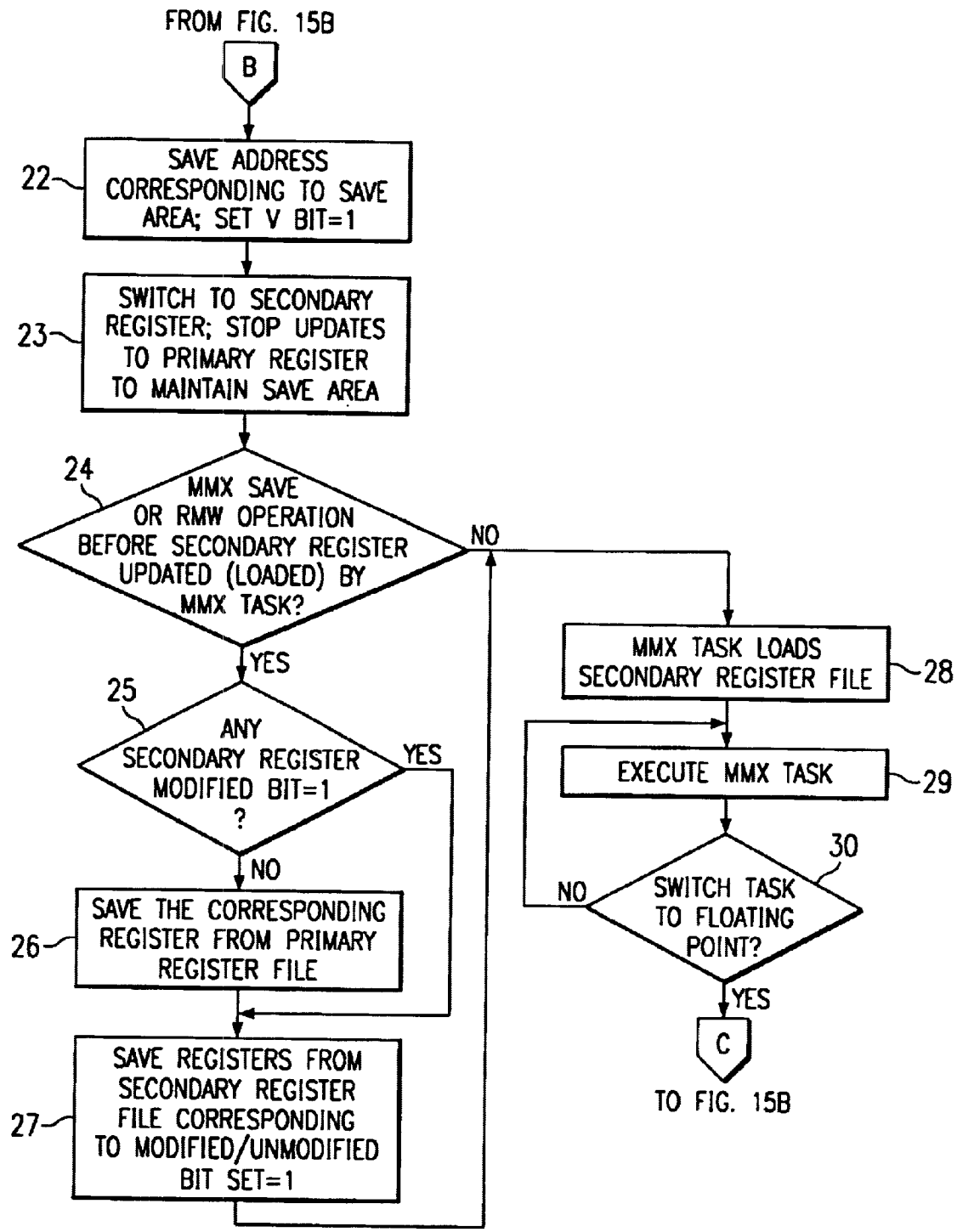
Figure 15D:
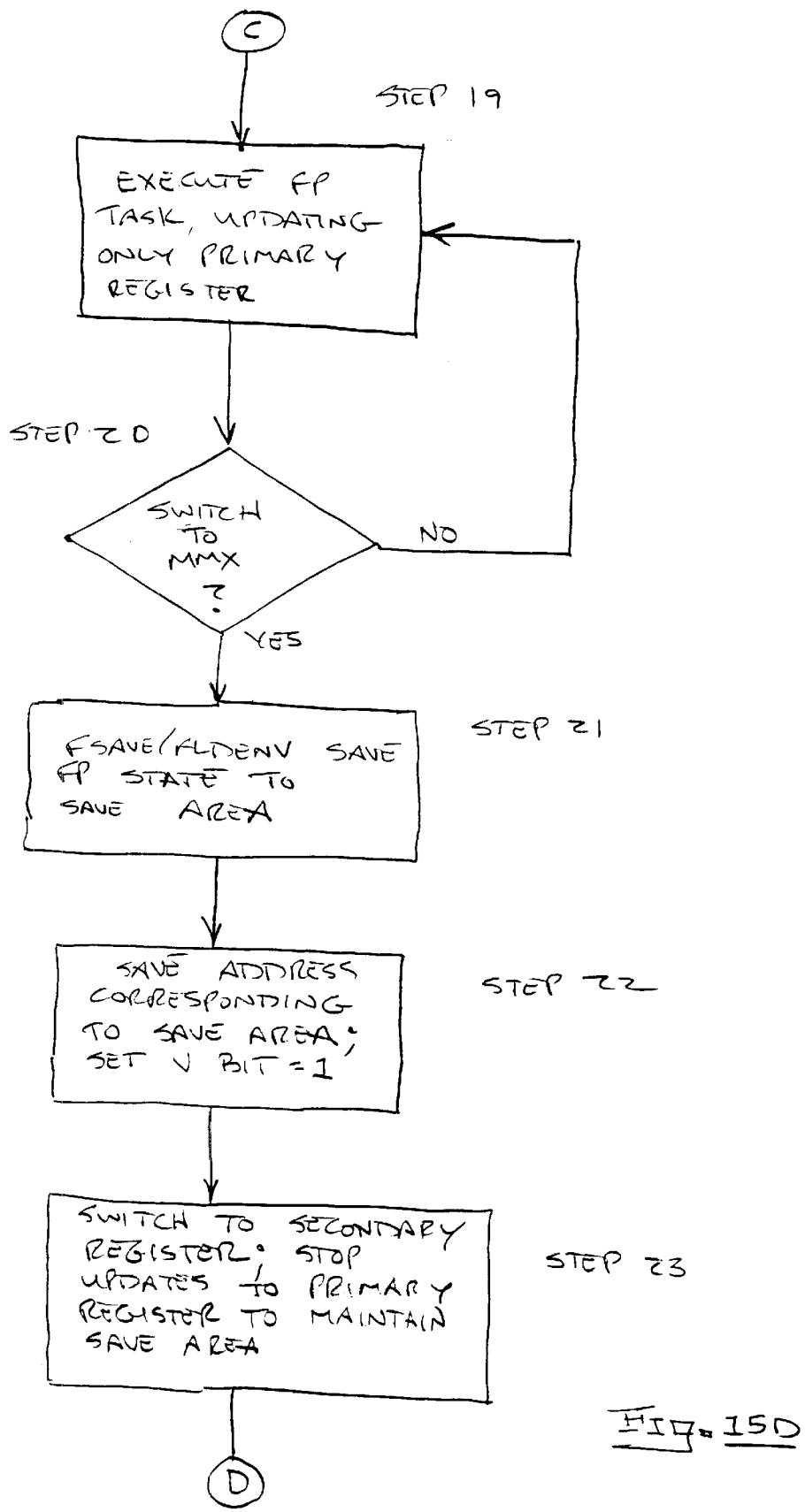
Figure 15E:
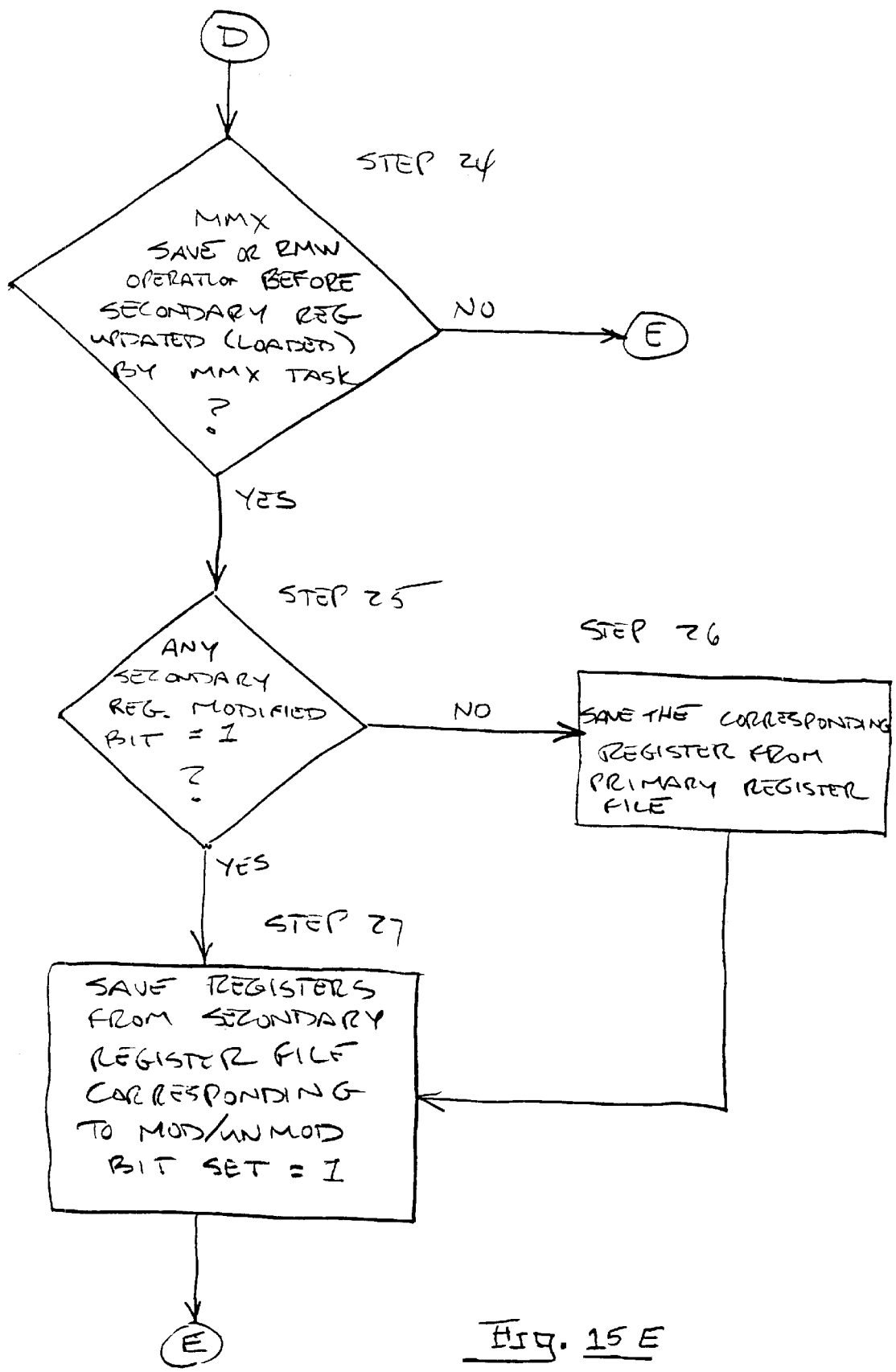
Figure 15F:
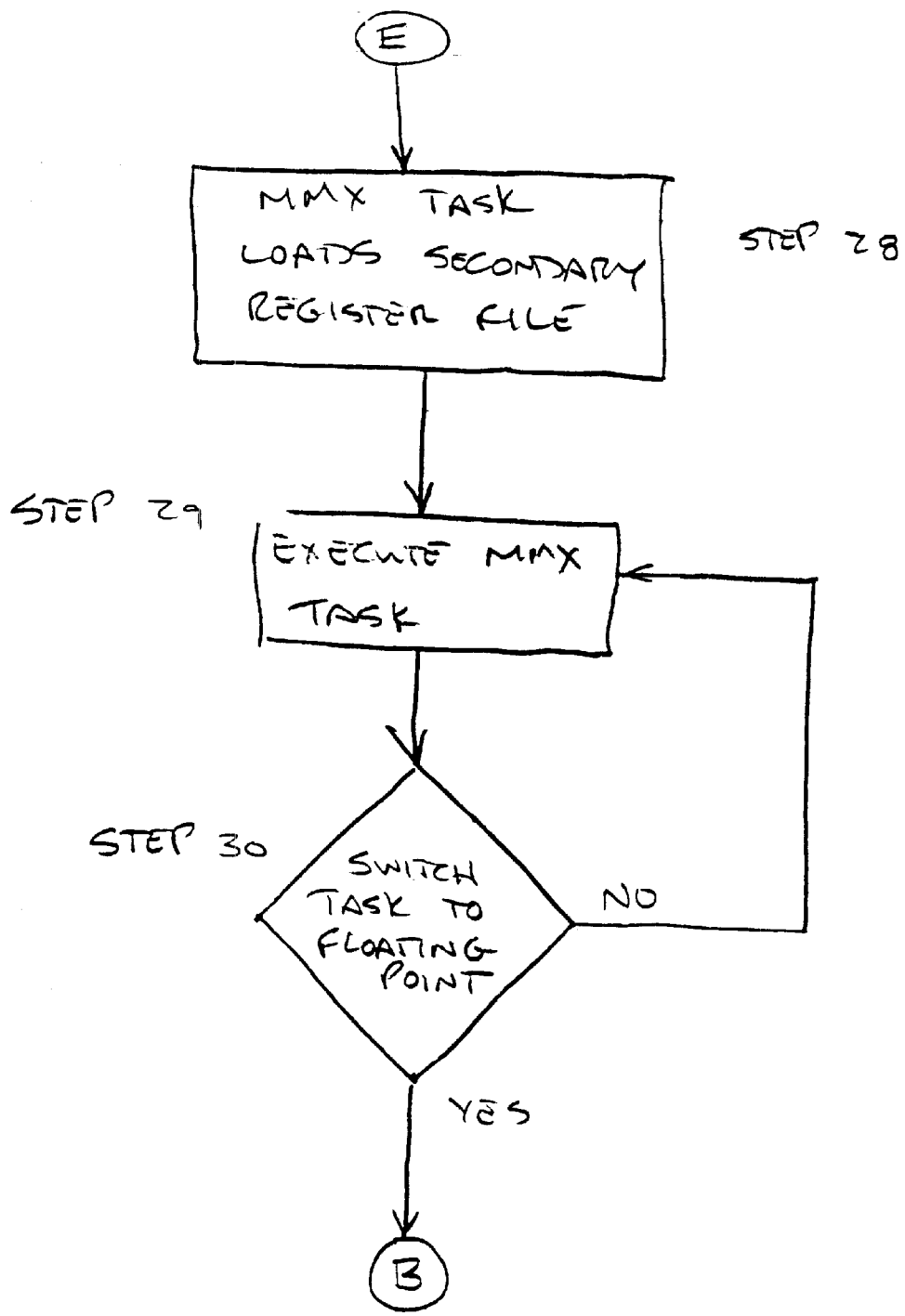

Referring to FIG. 13, when the processor executes a FRSTOR/FLDENV instruction, and the address of the FRSTOR/FLDBNV instruction matches the address corresponding to the last FSAVE/FSTENV instruction, and the valid bit is turned on (save area has not been modified), then the processor switches to the primary register file. The valid bit is now reset. The contents of the primary register file will be the same that existed at time the last FSAVE/FLDENV instructions was executed, i.e. the primary register will be the same as the save area.

If the processor then executes a second FRSTOR/FLDENV and the address corresponding to the last FSAVE/FSTENV matches the address of the FRSTOR/FLDENV instruction and none of the registers have been modified, then the processor will continue using the primary registers and consider the FRSTOR/FLDENV instruction a NOP (no operation). In this case the primary register 110 corresponds to the save area. If the primary registers are modified, then the contents of the register corresponding to the previous FSAVE/FSTENV instruction are lost and the processor must restore the contents of the primary register file from the memory subsystem. In this case, the valid bit 121 is also reset.

Referring to FIGS. 15A through 15F, the operation of the present invention will be further described using a flowchart representing the process implemented by the present invention. It should be noted that for ease of understanding this description will use the example of context switching between floating point and MMX operations. However, this process also applies to switching between any other contexts, such as between different floating point contexts. At step 1, the program is started, and initialized at step 2, which includes initializing the register file to cause only the primary floating point register 110 to be updated when a floating point instruction updates a register, and clearing the modified/unmodified bits in field 101 of secondary register file 100 to zero (set=0). It will be assumed for the purposes of this description that the current task to be performed are floating point operations. At step 3, the floating point task is executed using only the primary register file 110. It is then determined at step 4 if a task switch to MMX operations is to occur. If no, then the process loops back to step 3 and the processor continues executing the floating point task. If, however, it is determined at step 4 that a task switch to MMX operations is to occur, then at step 5 an FSAVE/FSTENV instruction is executed to save the state of the floating point state as reflected by the primary register file 100. The MMX operation is intrusive, such that the programmer and/or operating system saves the floating point state to a save area.

When the FSAVE/FSTENV instruction executes, the processor switches to the secondary register file 100 and does not update the primary register file 110 in order to maintain the save area (step 6). At step 7, the address of the save area in memory where the state of the primary register is stored is saved in register 120 and the valid bit "V" in field 121 is set=1. Step 8 then causes a signal to be sent to load/store unit 22 that causes snooping operations to commence on the saved address in register 120. Generally, the MMX task loads the registers R0–R7 in secondary register file 100 before performing any MMX operations. At step 9 the secondary register file is loaded and the corresponding modified/unmodified bit in field 101 set=1, indicating that the loaded register has been modified, with respect to its previous contents. The MMX task is then executed at step 10.

It is then determined at step 11 if a context switch to floating point (FP) operations is to occur. If not, then the process continues the MMX task by looping back to step 10. However, if a context switch back to a floating point task is to occur, then the previous floating point state must be restored. That is, the primary register file must be returned to the state it was in when the previous floating point task ended. An FRSTOR/FLDENV instruction is executed at step 12 to restore the previously saved FP state. The present invention then determines at step 13 whether a snoop hit has occurred to the save area, or a store instruction has accessed the save area, by checking valid bit 121. If the bit is set=0, then a snoop hit or store has occurred to the save area and all instructions that have been issued since the FRSTOR/FLDENV instruction was executed must be flushed and reissued (step 16). At step 17, the primary register is restored from the memory subsystem, since the save area has been modified. If, at step 13, it was determined that a snoop hit or store operation did not occur to the save area, then step 14 determines if the save area address in register 120 matches the address encoded in the FRSTOR/FLDENV instruction. If not, then the FP state must be restored from the memory subsystem and the process continues to step 17. However, if the save area and FRSTOR/FLDENV addresses do match, then the FP state can be restored by switching to the primary register file where the state has been maintained, thereby minimizing the number of CPU cycles required (step 15). Subsequent to steps 15 and 17, the modified/unmodified bits in field 101 of secondary register file 100, as well as the valid bit 121 are cleared (set=0) at step 18. After the floating point state has been restored, the processor executes the floating point task at step 19 and updates only the primary register file 110.

Step 20 then determines if a switch back to an MMX task is to occur. If not, then the process loops back to step 19 and continues processing the floating point task. When a context switch back to MMX (or another context) is to occur, then step 21 saves the floating point state by executing an FSAVE/FSTENV instruction, which saves the state of the primary register file to a save area in memory. The address of the save area is stored in register 120 at step 22 such that snoop/store operation monitoring can occur. Also at step 22, the valid bit in field 121 is set to logical 1. The processor then switches to secondary register file 100 and ceases updating primary register file 110, in order to maintain the save area (step 23).

It is then determined, at step 24, if an MMX save operation or read-modify-write (RMW) operation is implemented before the secondary register is loaded by the MMX task. If the MMX task operates in its usual manner (i.e. the save or RMW does not occur prior to loading the registers) and loads the secondary register prior to performing an MMX operation, then the process of the present invention skips to step 28 and the secondary register file is loaded by the MMX task. However, if the MMX task does implement a save or RMW prior to loading the secondary register file, then the process of the present invention continues to step 25. This step determines if any of the modified/unmodified bits in field 101 have been set=I, indicating that a modification has occurred to their corresponding register in secondary register file 100. If not, then the register(s) in primary register file 110 that correspond to the unmodified register(s) in the secondary register file 100 are saved at step 26. For the registers in secondary register file having a corresponding modified/unmodified bit set=1, indicating that the prior save or RMW operation did modify that register, then save the contents of the modified register from secondary register file 100 (step 27). As noted above, the modified data in the secondary registers having a corresponding modified/unmodified bit set=1 will be the most current data and will be selectively saved. If the data in the secondary register file is the same as the data in the primary register file (modified/unmodified bit(s) set=0), then the data in the primary register file will be saved.

Subsequent to step 26, the process of the present invention also continues to step 27 where the remaining modified registers in the secondary register file (i.e. those registers having corresponding bit in field 101 is set=1) are saved from the secondary register. It can be seen that the present invention allows selective saving of state information.

Subsequent to step 27, the MMX loads the secondary register file at step 28. The MMX task is then executed at step 29. It is then determined at step 30 if there is to be a context switch back to floating point operations. If not, then the process loops back to step 29 and continues executing the MMX task. However, when a switch to floating point operations is to occur the process of the present invention returns to step 12 and an FRSTOR/FLDENV instruction is executed thereby restoring the floating point state.

Thus, it can be seen that the present invention allows a great reduction in clock cycles when saving and restoring the FPU, MMX or other context state by using the secondary register file. Selective context storing is possible since the state of the previous context is maintained in that context's register file, e.g. FP, MMX (primary, secondary register files).

When a context save operation occurs the state is selectively saved to the memory subsystem. That is, only the modified registers in the previous context need be saved (i.e. the modified registers in the secondary register file), since saving the unmodified registers has already occurred in conjunction with execution of the FSAVF instruction. In this manner bus traffic and system overhead is saved, because only information that may be accessed for restoration of the context will be transferred.

Upon restoration of the previous context, the present invention first checks to see whether a snoop hit has occurred to the area in the memory subsystem where the context was saved. If a snoop hit has occurred, then the context must be restored from memory. But, if a snoop hit has not occurred (vast majority of the time) and the previous registers (primary/secondary) have not been modified, then restoration can occur by merely resuming the operations of the previous context.

In another preferred embodiment, the latency associated with executing the FSAVE and FRSTOR instructions can be reduced by reserving an area in the data cache for the floating point and/or MMX state. This reserved area in the data cache will not be subject to replacement. This technique will reduce the number of CPU cycles required to save/restore the floating point state to at least 12–15 CPU cycles, but much less than the 28–250 clock cycles required by conventional FP save/restore operations. The cycles are saved since the cache does not save the floating point/MMX state in main memory at any time. When the FRSTOR instruction is executed, the same data can be restored from the reserved location in cache. In this preferred embodiment, a mechanism must be provided to prevent other instructions from modifying or overwriting the data stored in the FPU/MMX reserved area in the cache. A special bit or register is required to signal the cache to reserve the FPU/MMX area A tradeoff associated with this solution is that the software will be required to provide the signal to the cache to reserve the FPU/MM area. Thus, requiring an enhancement to the current code existing in the marketplace today that is written for the Intel platform. Another tradeoff is present with this preferred embodiment, since the cache area is effectively reduced because the reserved portion excludes use of that portion of the cache for other microprocessor operations. This tradeoff is believed to be acceptable for most designs, since cache sizes are becoming increasingly larger with the newer technology that is being used in today's microprocessors.

Although certain preferred embodiments have been shown and described, it should be understood that many changes and modifications may be made therein without departing from the scope of the appended claims.

What is claimed is:

1. A CPU having a first register file for use by a first task and a second register file for use by a second task, said first and second tasks being executed by said CPU; comprising:
   means for saving first state information for said first task in said first register file upon a switch to said second task;
   means for determining if said first state information has been modified during execution of said second task; and
   means for restoring said first state information from said first register file, upon a switch to said first task, when said first state information is unmodified.

2. A CPU according to claim 1 wherein said first register file includes a plurality of first registers and said second register file includes a plurality of second registers, each corresponding to one of said plurality of first registers.

3. A CPU according to claim 2 further comprising means for indicating when any of said second registers in said second register file is modified.

4. A CPU according to claim 3 further comprising:
   means for saving second state information for said second task upon a switch to said first task; and
   means for determining whether any of said second registers in said second register file have been modified.

5. A CPU according to claim 4 wherein said means for saving second state information comprises means for saving said second state information from said second register file when any of said second registers in said second register file are modified.

6. A CPU according to claim 4 wherein said means for saving second state information further comprises means for saving said second state information from modified ones of said second registers in said second register file; and
   means for saving said first state information from said first registers, corresponding to unmodified ones of said second registers, as said second state information.

7. A CPU according to claim 1 wherein said means for saving said first state information stores said first state information to a save area in memory.

8. A CPU according to claim 7 wherein said means for determining comprises:
   means for storing an address corresponding to said save area;
   means for snooping on said'save area address during said second task to determine if said save area has been accessed; and
   means for setting a valid bit corresponding to said save area address when said save area address is accessed.

9. A CPU according to claim 8 wherein said means for restoring comprises a CPU instruction including a restore address corresponding to a memory location where said first state information is stored.

10. A CPU according to claim 9 wherein said means for restoring further comprises:
    means for determining whether said save area has been accessed; and
    means for determining whether said save area address matches said restore address.

11. A CPU according to claim 10 wherein said first state information is restored from said first register file only when said save area has not been accessed and said save area address matches said restore address.

12. A data processing system, comprising:
    a CPU including at least one execution unit having a first register file with a plurality of first registers to be used by a first task, and a second register file with a plurality of second registers each corresponding to one of said first register to be used by a second task, said first and second tasks being processed by said execution unit:
    a memory subsystem connected to said CPU by a bus;
    means for saving first state information for said first task in said first register file upon a switch to said second task, and for storing said first state information to a save area in said memory subsystem;
    means for storing an address corresponding to said save area in said memory subsystem in a save area address register;
    means for determining if said first state information has been modified during execution of said second task by snooping on said save area address; and
    means for restoring said first state information from said first register file, upon a switch to said first task, when said first state information in said save area is unmodified and the save area address matches a restore address included in a CPU instruction used by said execution unit to restore said first state information.

13. A system according to claim 12 further comprising:

means for saving said second state information upon a switch to said first task;

means for determining whether any of said second registers in said second register file have been modified.

14. A system according to claim 13 wherein said means for saving said second state information comprises means for saving said second state information from said second register file when any of said second registers in said second register file are modified.

15. A system according to claim 13 wherein said means for saving second state information further comprises:

means for saving said second state information from modified ones of said second registers in said second register file; and means for saving said first state information from said first registers, corresponding to unmodified ones of said second registers, as said second state information.

16. A method of executing a CPU having a floating point execution unit to execute a floating point task using a first register file and a second task using a second register file, said method comprising the steps of:

saving first state information for said first task in said first register file upon a switch to said second task;

determining if said first state information has been modified during execution of said second task; and restoring said first state information from said first register file, upon a switch to slid first task, when said first state information is unmodified.

17. A method according to claim 16 further comprising the steps of:

saving second state information for said second task upon a switch to said first task; and determining whether any of said second registers in said second register file have been modified.

18. A method according to claim 17 wherein said step of saving second state information comprises the step of saving said second state information from said second register file when any of said second registers in said second register file are modified.

19. A method according to claim 18 wherein said step of saving second state information further comprises the steps of:

saving said second state information from modified ones of said second register in said second register file; and means for saving said first state information from said first registers, corresponding to unmodified ones of said second registers, as said second state information.

20. A method according to claim 19 wherein said step of determining comprises the steps of:

storing an address corresponding to said save area;

snooping on said save area address during said second task to determine if said save area has been accessed; and setting a valid bit corresponding to said save area address when said save area address is accessed.

21. A method according to claim 20 wherein said step of restoring comprises the steps of:

determining whether sand save area has been accessed; and determining whether said save area address matches said a restore address included in a CPU instruction for restoring said floating point state information; and wherein said first state information is restored from said first register file only when said save area has not been accessed and said save area address matches said restore address.

\* \* \* \* \*